Oct. 4, 1927.
T. E. THOMPSON
1,644,160
SELF CHECKING TEST DEVICE
Filed Aug. 5, 1926 2 Sheets-Sheet 1
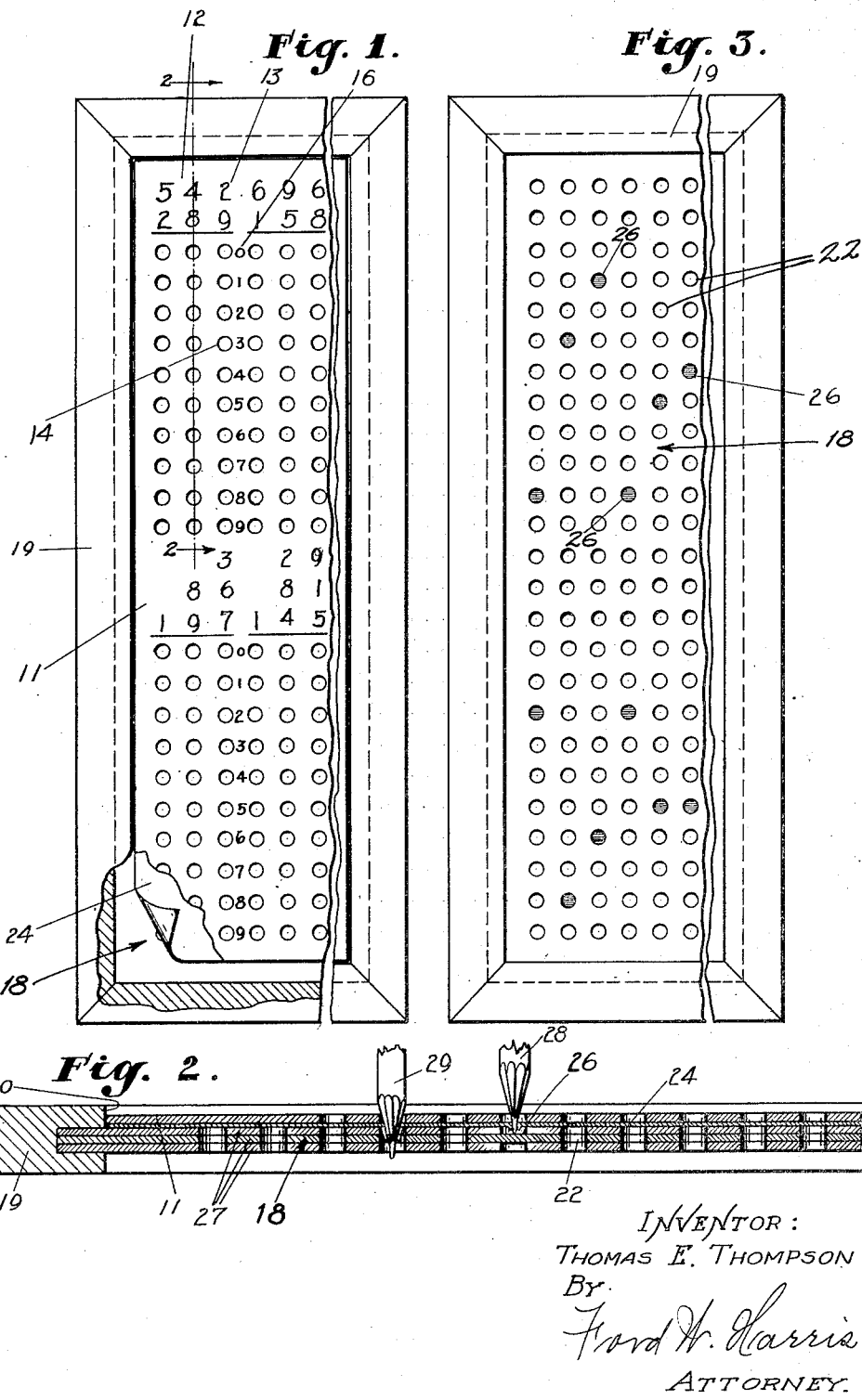

Oct. 4, 1927.
T. E. THOMPSON
1,644,160
SELF CHECKING TEST DEVICE
Filed Aug. 5, 1926     2 Sheets-Sheet 2
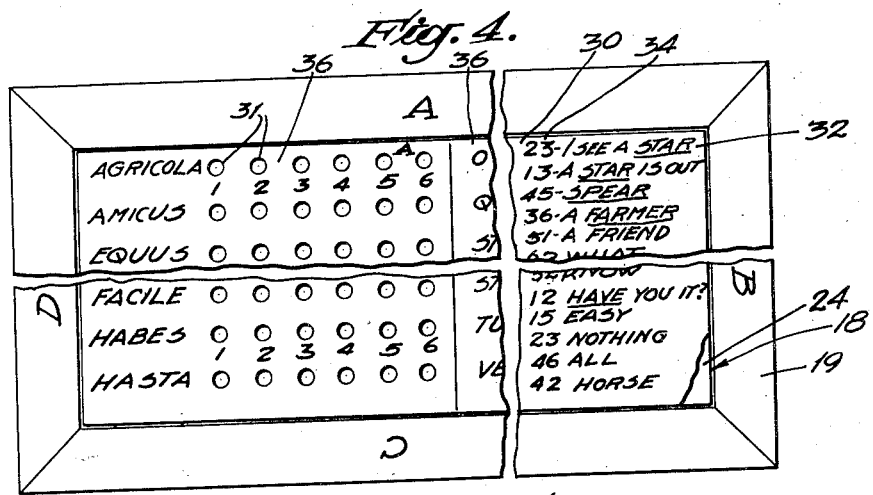
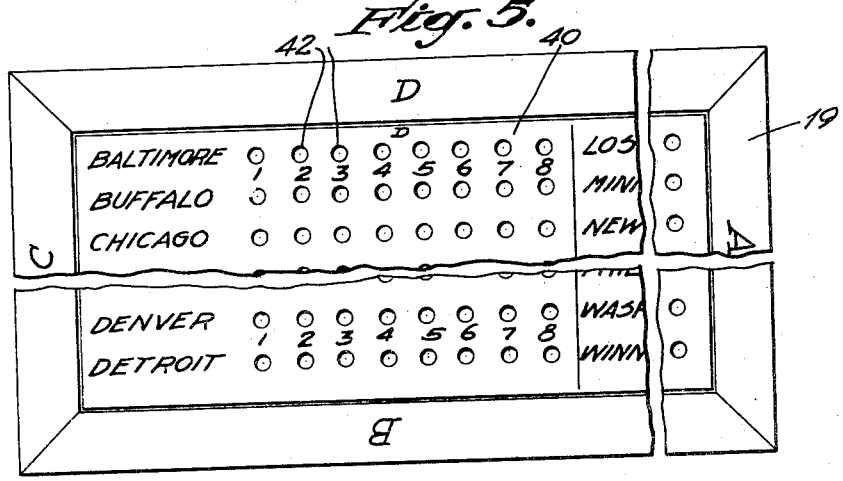
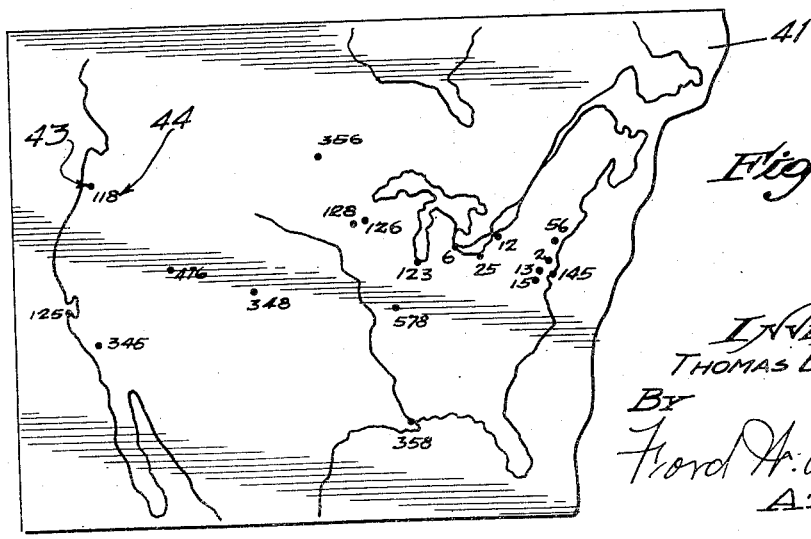

Patented Oct. 4, 1927.

1,644,160

UNITED STATES PATENT OFFICE.

THOMAS E. THOMPSON, OF LOS ANGELES, CALIFORNIA.

SELF-CHECKING TEST DEVICE.

Application filed August 5, 1926. Serial No. 127,284.

My invention relates to a novel form of self-checking test device and particularly to a device which may be used in training persons on different subjects. One important use of my invention is for training school children. Ordinarily, problems are given to the children which are to be answered. The problem sheets must then either be handed in to the teacher for checking, or in some cases the answers are read off to the children who do their own checking. It will be seen that this method consumes considerable time in the checking of the problems.

It is an object of this invention to provide a self-checking test device in which the pupil will be immediately notified if his answer is wrong, but will not be told the right answer. The value of a device of this character is that the pupil may refigure the problem immediately in order to obtain the right answer. This sort of training is very desirable because it will show the pupil just where the error lies.

My invention is useful in teaching various subjects such as grammar, geography, etc., but it is particularly useful in the teaching of mathematics. In the following description I will describe my invention as used in the teaching of mathematics, languages and geography.

Other objects and salient advantages of the invention will be made evident hereinafter.

Referring to the drawing in which I illustrate one form of my invention,

Fig. 1 is a contracted view showing the device of my invention ready for use.

Fig. 2 is a section taken on the line 2—2 of Fig. 2.

Fig. 3 is a face view of the check-plate of the invention.

Fig. 4 is a fragmentary view showing the device of my invention used in the teaching of a language.

Figs. 5 and 6 are fragmentary views illustrating the use of my invention in the teaching of geography.

Referring to Fig. 1, the numeral 11 represents a data-sheet. On this data-sheet are a number of problems represented by the numeral 12. In this form of the invention the problems are addition problems. Arranged below each column of numerals 13 of each problem is a row of answer locations in the form of openings 14. Arranged at one side of the answer locations 14 of each problem 12 are identifying marks 16. Reading from top to bottom, the identifying marks read from zero to 9 inclusive. The data-sheet 11 may be made any convenient size and may have any number of problems thereon.

Referring particularly to Figs. 2 and 3, the numeral 18 represents a check-plate which is supported in a frame 19. The frame 19 is provided with walls 20 which serve the purpose of centralizing the data-sheet 11. This is illustrated in Figs. 1 and 2. The check-plate 18 is provided with checking means in the form of rows of openings 22, which openings are arranged so that there is one opening 22 below each answer location 14. Placed between the check-plate 18 and the data-sheet 11 is a work-sheet 24.

In using the invention, take for instance the example 12 in the upper left-hand corner of Fig. 1, the pupil adds the first column of figures and the answer is 11. By use of a pencil or other suitable instrument the pupil punches the work-sheet 24 through the answer location 14 adjacent to the numeral 1. The pupil carries 1 and adds it to the second column of numerals, the sum thereof being 13. The pupil then punches the work-sheet 24 through the answer location 14 adjacent to the identifying mark 3 but in the central column of this problem. 1 is carried and added to the sum of the left-hand column of numerals, the total being 8. The pupil then punches the work-sheet 24 through the answer location 14 adjacent to the identifying mark 8 but in the left-hand column.

Referring to Figs. 2 and 3, the openings 22 which rest below the correct answer locations of the different problems are provided with stops 26. Referring particularly to Fig. 2, the check-plate 18 is composed of three plies 27, these plies being provided with openings. Wherever a stop 26 is to be provided the central ply 27 is not punched. In Fig. 2 the numeral 28 represents a pencil which is extended through the proper answer location 14. It will be seen that the point thereof passes only a short distance through the work-sheet 24 and engages the stop 26. The numeral 29 represents a pencil which is inserted through the wrong answer location. It will be seen that the pencil 29 extends through the work-sheet 24 a considerable distance, there being no stop to limit its motion.

In working the problems, the pupil immediately upon punching the work-sheet 24 is notified as to whether or not he has properly added the column of figures. If the pupil does not get the right answer, he is immediately notified that his answer is wrong but he does not know what the correct answer is. For example, take the first column of the upper left-hand problem of Fig. 1, the sum of this problem is 11. Suppose the pupil gets the sum of 12, he will punch the answer location 14 adjacent to the number 2 identifying the mark 16. His pencil will be punched through the worksheet 24 a considerable distance, as indicated in Fig. 2, in connection with the pencil 29. The pupil, therefore, knows that his answer is wrong, but he is not informed that the correct answer is 11. The pupil will then refigure the column of numerals and will obtain an answer, again punching the worksheet 24. If in his second attempt he gets the correct answer, the pencil will engage one of the stops 26, as in the case of the pencil 28 in Fig. 2.

It is important that the check-plate 18 be arranged so that the pencil is allowed to penetrate the work-sheet 24 when the correct answer is indicated, and a different distance when the wrong answer is indicated. This may be obtained by using the stops 26 below the correct answer locations, or, on the other hand, the same results may be obtained by using the stops 26 in all of the openings 22 with the exception of the one resting below the correct answer location. In this case the pencil would be inserted through the work-sheet 24 a considerable distance when the correct answer was obtained and only a short distance whenever an erroneous answer was obtained.

As suggested in the introduction of this specification, the invention may be also used in problems pertaining to other subjects. For instance, in Fig. 4 a data sheet 30 is shown as resting upon a work sheet 24 which in turn rests upon a check plate 18 in the same manner as shown in Fig. 2.

The data sheet 30 has openings 31 formed therein which are disposed above and register with certain of the openings 22 in the check plate 18. In the same manner as previously described, certain of the stops 26 are disposed in the openings 22 where the check plate 18 has not been punched. The data sheet 30 comprises a lesson in Latin. The right hand margin portion of the data sheet 30 is unpunched and a column 32 of English words is printed thereon. These words are either printed singly or in a certain grammatical use, indicating a specific case. For instance, at the head of the column appears the sentence "I see a star." The underlined word in this sentence indicates the English word for which it is desired that the pupil find the Latin equivalent. A key number 34 is disposed opposite each English construction in the column 32, the first of these key numbers being "23". The portion of the data sheet 30 not taken up by the column 32 of English words is divided into columns 36, the left hand portions of which are taken up by sub columns of Latin words arranged in alphabetical order. A string of the openings 31 is arranged to follow each of these Latin words, as shown in Fig. 4. The openings 31 are numbered from left to right from 1 to 6 in the data sheet 30 as it is shown in the present illustration.

The use of the data sheet 30 is as follows. Beginning with the English word at the top of the column 32, the pupil chooses from the columns of Latin words what he thinks to be the Latin equivalent thereof. In the string of holes 31 following this Latin word, he punches through the holes corresponding in number to the digits of the key number opposite the English word. Thus in the third example, the word "Spear" has its Latin equivalent in the word "Hasta". Should the pupil correctly choose this Latin equivalent of the word "Spear", he would punch with his pencil through the holes 31 opposite the digits 4 and 5. The data sheet 30 is so made up that the digits of the key numbers 34 represent the holes 31 under which the stops 26 are disposed. Therefore, the stopping of the pupil's pencil after a slight penetration of the work sheet 24 thereby, quickly indicates the correctness of the pupil's answer. Should the answer be incorrect, obviously the pencil would protrude a considerable distance through the work sheet and indicate at once to the pupil that his choice was faulty and enable him to reconsider his answer at once.

The geographical problem illustrated in Figs. 5 and 6 requires the use of a data sheet 40 with the usual frame 19 and check plate 18 as illustrated in Figs. 2 and 3, and a separate map 41 shown in Fig. 6. The data sheet 40 is provided with columns of geographical titles, these titles in the embodiment shown being the names of cities. Opposite each of these names is a string of openings 42 which are numbered in a similar manner to the holes 31 in the data sheet 30.

The map 41 is provided with spots 43 indicating the location thereon of the cities whose names are printed upon the data sheet 40. At each spot 43 a key numeral 44 is printed upon the map 41. In working out the problem the pupil studies the map 41 and endeavors to identify the names of the cities on the data sheet 40 with their locations indicated by the spots 43. For instance, the pupil decides that the spot 43 having the key numeral "348" indicates the location of the city of Denver. To check the correctness of this answer he punches through the holes 42 opposite the name "Denver" upon the data sheet 40 which correspond to the digits of the reference numeral "348". If this is the correct answer, stops 26 will be disposed beneath these holes and the pupil will be at once notified thereby of the correctness of his answer. If the answer is incorrect, the absence of stops beneath some of the holes punched by the pupil's pencil will at once notify the pupil of his error and permit him to reconsider his choice.

Although the view of the check plate 18 shown in Fig. 3 is fragmentary, this check plate is square in shape and the holes 22 are formed in regular parallel lines which also form a square. Thus with one edge of the check plate disposed at the top a given arrangement of the stops 26 will be provided, while with any other of the edges of the check plate 18 disposed at the top different arrangements of the stops 26 will be provided. In order that the pupil may not become acquainted with the positions of the stops 26 and by this knowledge be able to decipher the correct answers to the problems without actually working these problems, it is intended to turn the check plate 18 so that different of its edges are disposed at the top when different data sheets such as the data sheets 12, 30 or 40 are used over the check plate 18. For the purpose of determining which of these edges of the check plate 18 are to be used with a given data sheet, the frame 19 in which the check plate 18 is mounted has a capital letter such as A, B, C, or D printed upon each of the edges thereof as a distinguishing mark. Likewise, each of the data sheets is provided with a capital letter which indicates which of the lettered edges of the check plate 18 is to be placed at the top when that data sheet is employed over the check plate in the working of problems.

By reference to Fig. 2, it will also be noted that the check plate 18 may be turned over and used in the same manner as it is used in the position in which it is shown in this figure. On the under side of the check plate the edges thereof may also each be designated by a distinct capital letter, thus providing eight different positions which the check plate 18 may hold relative to a data sheet during the working of a problem. It will also be clear that in each of these eight positions of the check plate 18 the arrangement of the stops 26 will be distinct.

It is thought to be practically impossible that the pupil could familiarize himself with the positions of the stops 26 in every one of eight different positions of the check plate 18; therefore it is contemplated that each pupil shall be provided with a check plate 18 mounted in a frame 19 and that the data sheets be given out by the teacher at the time of the lesson. It is thus certain that the pupil will not be able to decipher the answers in advance of the lesson. It is also contemplated that the pupil be required to place a work sheet 24 over the check plate 18 previous to placing the data sheet in the frame 19. Thus the position of the various stops underneath the holes of the data sheet will not become known to the pupil prior to his actual working of the problem.

I claim as my invention:

1. A self-checking test device comprising: a data-sheet having a problem and answer locations; a work-sheet placed adjacent to said data-sheet; and a check-plate placed adjacent to said work-sheet, said check-plate having checking means arranged below said answer locations.

2. A self-checking test device comprising: a data-sheet having a problem and answer locations; a work-sheet placed adjacent to said data-sheet; and a check-plate placed adjacent to said work-sheet, said check-plate having checking means arranged below each of said answer locations.

3. A self-checking test device comprising: a data-sheet having a problem and answer locations; a work-sheet placed adjacent to said data-sheet; and a check-plate placed adjacent to said work-sheet, said check-plate having checking openings arranged below said answer locations, certain of said checking openings having stops.

4. A self-checking test device comprising: a data-sheet having a problem and answer locations; a work-sheet placed adjacent to said data-sheet; and a check-plate placed adjacent to said work-sheet, said check-plate having checking openings arranged below said answer locations, said checking openings below correct answer locations having stops.

5. A self-checking test device comprising: a data-sheet having a problem and answer locations and identifying marks for said answer locations; a work-sheet placed adjacent to said data-sheet; and a check-plate placed adjacent to said work-sheet, said check-plate having checking means arranged below said answer locations.

6. A self-checking test device comprising: a data-sheet having a problem and answer locations and identifying marks for said answer locations; a work-sheet placed adjacent to said data-sheet; and a check-plate placed adjacent to said work-sheet, said check-plate having checking openings arranged below said answer locations, certain of said checking openings having stops.

7. A self-checking test device comprising: a data-sheet having a problem and answer locations and identifying marks for said answer locations; a work-sheet placed adjacent to said data-sheet; and a check-plate placed adjacent to said work-sheet, said check-plate having checking openings arranged below said answer locations, said checking openings below correct answer locations having stops.

8. A self-checking test device comprising: a data-sheet having a problem and answer location openings; a work-sheet placed adjacent to said data-sheet; and a check-plate placed adjacent to said work-sheet, said check-plate having checking means arranged below said answer location openings.

9. A self-checking test device comprising: a data-sheet having a problem and answer location openings; a work-sheet placed adjacent to said data-sheet; and a check-plate placed adjacent to said work-sheet, said check-plate having checking openings arranged below said answer location openings, certain of said checking openings having stops.

10. A self-checking test device comprising: a data-sheet having a problem and answer location openings and identifying marks for said answer location openings; a work-sheet placed adjacent to said data-sheet; and a check-plate placed adjacent to said work-sheet, said check-plate having checking means arranged below said answer location openings.

11. A self-checking test device comprising: a data-sheet having a problem and answer location openings and identifying marks for said answer location openings; a work-sheet placed adjacent to said data-sheet; and a check-plate placed adjacent to said work-sheet, said check-plate having checking openings arranged below said answer location openings, said checking openings below correct answer location openings having stops.

12. A self-checking test device comprising: a data-sheet having a problem and answer location openings, said answer location openings being numbered zero to nine inclusive; a work-sheet placed adjacent to said data-sheet; and a check-plate placed adjacent to said work-sheet, said check-plate having checking openings arranged below said answer location openings, certain of said checking openings having stops.

13. A self-checking test device comprising: a data-sheet having answer locations; a work-sheet placed adjacent to said data-sheet; and a check-plate placed adjacent to said work-sheet, said check-plate having checking means arranged below said answer locations.

14. A self-checking test device comprising: a data-sheet having answer locations; a work-sheet placed adjacent to said data-sheet; and a check-plate placed adjacent to said work-sheet, said check-plate having checking means arranged below each of said answer locations.

15. A self-checking test device comprising: a data-sheet having answer locations; a work-sheet placed adjacent to said data-sheet; and a check-plate placed adjacent to said work-sheet, said check-plate having checking openings arranged below said answer locations, certain of said checking openings having stops.

16. A self-checking test device comprising: a data-sheet having answer locations and identifying marks for said answer locations; a work-sheet placed adjacent to said data-sheet; and a check-plate placed adjacent to said work-sheet, said check-plate having checking means arranged below said answer locations.

17. A self-checking test device comprising: a data-sheet having a problem and answer locations; a work-sheet placed adjacent to said data-sheet; and a check-plate placed adjacent to said work-sheet, said check-plate having checking openings which may be arranged below said answer locations in any of a plurality of positions of said check-plate relative to said data-sheet, certain of said checking openings having stops.

In testimony whereof, I have hereunto set my hand at Los Angeles, California, this 28th day of July, 1926.

THOMAS E. THOMPSON.